United States Patent [19]

Baumann et al.

[11] 3,847,656
[45] Nov. 12, 1974

[54] METHOD OF COATING OR BONDING METALS

[75] Inventors: Hans Baumann; Rudolf Glaser; Peter Bauer, all of Ludwigshafen, Germany

[73] Assignee: BASF Aktiengesellschaft, Ludwigshafen/Rhine, Germany

[22] Filed: July 17, 1973

[21] Appl. No.: 379,986

[30] Foreign Application Priority Data
July 18, 1972 Germany............................ 2235141

[52] U.S. Cl....117/132 C, 117/161 UT, 117/161 UC, 117/232, 260/41 C, 161/216
[51] Int. Cl. ......................... B32b 15/08, C08f 1/84
[58] Field of Search............ 117/132 C, 132 R, 133, 117/232, 161 A, 161 UT, 161 UC; 156/51, 124; 260/45.95 H, 45.95 R, 41 C; 161/216; 8/4, 39

[56] References Cited
UNITED STATES PATENTS

| | | | |
|---|---|---|---|
| 3,734,979 | 5/1973 | Koleske et al. | 260/41 C |
| 3,795,540 | 3/1974 | Mildner | 161/216 |
| 3,663,663 | 5/1972 | McAda | 117/161 UC |
| 3,249,570 | 5/1966 | Potts et al. | 117/132 C |
| 3,211,808 | 10/1965 | Young et al. | 117/132 C |

FOREIGN PATENTS OR APPLICATIONS
951,987    3/1964    Great Britain............ 250/317

*Primary Examiner*—Charles E. Van Horn
*Assistant Examiner*—Michael W. Ball
*Attorney, Agent, or Firm*—Johnston, Keil, Thompson & Shurtleff

[57] ABSTRACT

A method of coating copper, brass, zinc, iron or steel or of bonding these metals to each other or to plastics materials using a mixture of an ethylene copolymer containing copolymerized units of an ethylenically unsaturated carboxylic acid and from 0.01 to 5 percent of the weight of said copolymer of a compound having the general formula:

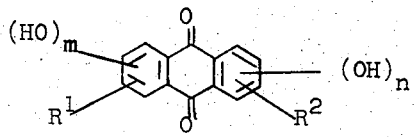

the resulting coated materials or bonded assemblies being particularly resistant to the action of water or moisture.

2 Claims, No Drawings

METHOD OF COATING OR BONDING METALS

The present invention relates to a method of bonding or coating copper, brass, zinc, iron and steel using an ethylene polymer containing from 0.05 to 30 percent by weight of polymerized units of an ethylenically unsaturated carboxylic acid.

German Published Application 1,795,269 discloses a method of bonding or coating materials using a terpolymer of ethylene, an ethylenically unsaturated carboxylic acid and an ester of an ethylenically unsaturated carboxylic acid. This method makes is possible, for example, to bond aluminum or copper sheeeting to polyethylene. The adhesion of bonded assemblies of aluminum and said terpolymer shows no substantial change when the assembly is stored for a long period in water, this being particularly so when the polymers contain specific stabilizing additives. However, the adhesion between copper and the same terpolymer diminishes greatly after only a short period of storage of assembly in water at a temperature of about 70°C, with the result that the layers can be readily parted from each other. Brass, zinc, iron and steel are similar to copper in this respect.

It is also well known that copolymers or ethylene and ethylenically unsaturated carboxylic acids and graft copolymers of an ethylene polymer and an ethylenically unsaturated carboxylic acid are suitable for use as coating materials or adhesives for a number of materials, for example aluminum and copper. These polymers adhere well to aluminum when stored for long periods in water or moist air, but not to copper.

It is an object of the invention to provide a method of bonding or coating copper, brass, zinc, iron and steel to give bondes assemblies in which the bond strenght shows substantially no change when the assemblies are stored in water or moist air for a long period of time.

The invention relates to a method of bonding or coating copper, brass, zinc, iron and steel using an ethylene polymer containing from 0.5 to 30 percent of polymerized units of an ethylenically unsaturated carboxylic acid. The process is characterized in that the ethylene polymer is used together with from 0.01 to 5 percent w/w of its weight of a compound of the general formula:

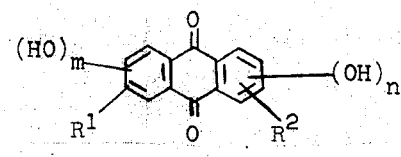

wherein
$n$ is equal to 1, 2 or 3 and
$m$ is equal to 0, 1 or 2 and
$R^1$ and $R^2$ denote H, Cl, Br. $NO_2$, $SO_3H$, COOH, phenoxy, alkyl, $NH_2$ or $NHR^3$, and
$R^3$ denotes alkyl or aryl.

An advantageous embodiment of the method consists in the use of an olefin polymer which is a copolymer containing from 60 to 90 percent w/w of polymerized units of ethylene, from 0.5 to 30 percent w/w of polymerized units of ethylenically unsaturated carboxylic acid and from 0.5 to 20 percent w/w of polymerized units of an ester of an ethylenically unsaturated carboxyic acid.

We prefer to use an ethylene copolymer containing, as polymerized units, from 60 to 90 percent w/w of ethylene, from 0.5 to 20 percent w/w of acrylic acid and from 0.5 to 20 percent w/w of t-butyl acrylate.

The ethylene polymers which may be used in the method of the invention are known per se. They may be made, for example, by copolymerization of ethylene with ethylenically unsaturated carboxylic acids in the presence or absence of esters of ethylenically unsaturated carboxylic acids at temperatures of from 150° to 400° C and pressures of more than 1,000 atm. in the presence of free-radical polymerization initiators, or by grafting ethylenically unsaturated carboxylic acids onto polyethylene or by grafting esters of ethylenically unsaturated carboxylic acids onto polyethylene and saponifying the reaction product. The melt index of the polymer is usually between 0.1 and 200 g/10 minutes (as measured according to ASTM–D 1238-65 T at a temperature of 190°C and under a weight of 2.16 kg), the softening range of the polymers being between 80° and 120°C.

The compounds of the general formula I to be used in the method of the invention are also well known. These are dyes or dye intermediates, derived from anthraquinone. Of these anthraquinone derivatives which are suitable, the following compounds are particularly noteworthy:

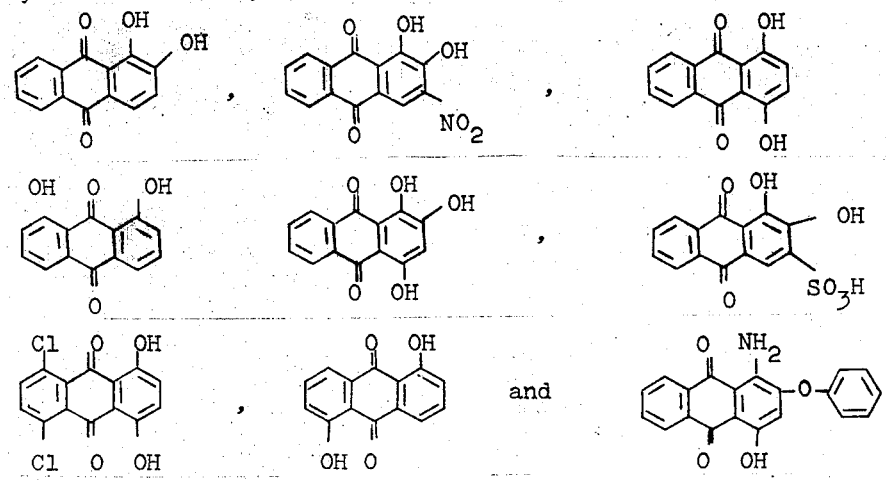

The alkyl groups $R^1$ and $R^2$ in formula I are preferably methyl and ethyl.. It is also possible to use a mixture of suitable anthraquinone derivatives. The ethylene polymer contains from 0.01 to 5 percent and preferably form 0.05 to 1 percent of its weight of compounds of formula I, which should be homogenously mixed with said polymer. Homogenous mixtures of the ethylene polymer and the anthraquinone derivative are made by known methods, for example by melting the polymer in a roller mill, extruder or kneader and mixing in the anthraquinone derivative. With the aid of these mixtures it is possible to bond copper, brass, zinc, iron and steel to each other or to other materials or to coat them, without the bond strength of the assemblies diminishing at all or to any marked extent when the assemblies are stored in water or moist air. By other materials we means particularly plastics, rubber, leather, paper, glass, ceramics, textiles, non-woven fabrics and metals not mentioned above, such as aluminum.

Copper, brass, zinc, iron and steel are coated or bonded with the mixtures of the invention by known methods. We prefer to use the mixture of polymer and anthraquinone derivative in the form of hot-melt adhesive sheets. Coating of the metals in question may also be carried out by extrusion-coating methods or by sintering a powdered polymer mixture containing stabilizer by sprinkling such mixture onto the metal having a temperature above the melting point of the polymer. Alternatively, the mixture used in the method of the invention may be dissolved in a solvent and bonding or coating then carried out by way of this solvent. Suitable solvents are for example aliphatic and aromatic hydrocarbons and aliphatic $C_{1-2}$ halohydrocarbons.

The method of the invention is particularly important for coating sheet metal, foils and tubes of steel, iron and cooper and also galvanized iron tubes or for bonding said metal objects to polyethylene. Copper foils coated on one or both sides with the mixture of the carboxyl-containing polymer and a compound of formula I are used for making electrical cable conductors. The method of the invention is also of great interest in the manufacture of sandwich assemblies comprising layers of metal and polyolefin. Such sandwich laminates combine low density with a high degree of stiffness. They are suitable for making parts of vehicle bodies, linings and walls in buildings, ships and airplanes and for making tanks and other containers. Such sandwich laminates may also be used for sound or heat insulting purposes, for example when the middle layer contains fillers such as mica or porous material. The sandwich laminates may be made up as follows, for example:

steel/polyethylene/steel, with carboxyl-containing ethylene polymer as adhesive between each layer, or copper/steel/copper, with carboxyl-containing polymer as adhesive between each layer.

The invention is described in greater detail below with reference to the Examples, in which parts and percentages are by weight.

EXAMPLE 1

Granules consisting of an ethylene copolymer containing 88 percent of ethylene, 4 percent of acrylic acid and 8 percent of t-butyl acrylate, as polymerized units, are mixed with 3 percent, based on the ethylene copolymer, of alizarin and 0..1 percent of 4,4'-thio-bis-3-methyl-6-t-butyl-1-phenol as thermal stabilizer, the mixture being melted and homogenized in an extruder at a temperature of 180°C and then extruded to a panel having a thickness of 1 mm. The melt index of the ethylene copolymer is 7 g/10 minutes.

A clean, degreased sheet of metal having a thickness of 0.5 mm and measuring 16 × 16 cm is coated on one side over a length of 4 cm with aluminum paint to form a parting layer. A 1 mm thick panel of ethylene copolymer, thermal stabilizer and alizarin, as described above, is then placed on the iron sheet thus prepared. The panel of polymer also measures 16 × 16 cm. The assembly is then placed in a press and bonding thereof is effected within 3 minutes at a temperature of 180°C under an applied pressure of 2 kg/cm$_2$.

For this purpose of testing the bond strength, the assembly is cut up into strips having a width of 2.5 cm. The polymer may be readily parted from the metal at the points where the latter has been coated with aluminum paint. The aluminum-coated end of the strip is then through 90° and the free metal end of the specimen is clamped in one jaw of a tensometer, whilst the free end of the polymer strip is clamped in the other jaw thereof. The jaws of the tensometer are then moved apart at a velocity of 100 mm/min. The bond strength is taken to be the force required to break the bond. It is more than 10 kg. At this value, the polymer strip stretches but there is no complete parting of the bond.

Two other specimens out from the same assembly are stored in water at a temperature of 70°C for 6 and 100 hours respectively. The bond strength is then determined in the manner describe above and is again more than 10 kg.

Similar results are obtained when, instead of 3 percent of alizarin, only 1 and 0.5 percent thereof is used respectively for the manufacture of the panels of carboxyl-containing ethylene polymer. When the polymer contains 0.5 percent of alizarin, the bond strength is more than 10 kg even after the assembly has been stored in water for 1,000 hours under the conditions stated above. If the amount of alizarin used is 0.25 or 0.05 percent, the bond strengths of the bonded assemblies before storage in water and after storage in water at 70°C for 6 hours are 10 kg in both cases but are 8 kg and 7 kg respectively after a storage time of 100 hours under the same conditions.

If the assembly in made not with iron sheeting but with a 0.5 mm thick sheet of copper, zinc or brass, the same mixture being used as coating material, the bond strength of the metal/polymer assemblies is more than 10 kg before storage in water and after storage in water at a temperature of 70°C for 6 or 100 hours.

COMPARATIVE EXAMPLE 1

Granules of an ethylene copolymer containing, as polymerized units, 88 percent of ethylene, 4 percent of acrylic acid and 8 percent of t-butyl acrylate are mixed with 0.1% of 4,4'-thio-bis-3-methyl-6-t-butyl-1-phenol to form a homogeneous mixture which is then compression molded at a temperature of 180°C to form a number of 1 mm thick polymer panels. As described in Example 1, these polymer panels are bonded to 0.5 mm thick sheets of iron, copper, zinc or brass having the same measurements, the bonded assemblies then being cut up into straips having a width of 2.5 cm. Whereas the bond strengths of the metal/polymer assemblies are in all cases more than 10 kg before storage in water, they are drop to values of less than 0.5 kg after storage in water at a temperature of 70°C for only 6 hours.

COMPARATIVE EXAMPLE II

Granules of an ethylene copolymer containing, as polymerized units 88 percent of ethylene, 4 percent of acrylic acid and 8 percent of t-butyl acrylate are mixed with 0.1 percent of 4,4'-thio-bis-3-methyl-6-t-butyl-1-phenol and 0.5 percent of anthraquinone to form a homogeneous mixture which is then compression molded at a temperature of 180°C to form a number of 1 mm thick polymer panels. As described in Example 1, these polymer panels are bonded to 0.5 mm thick sheets of iron, copper, zinc or brass having the same measurements, the bonded assemblies then being cut up into strips having a width of 2.5 cm. Whereas the bond strengths of the metal/polymer assemblies are in all cases more than 10 kg before storage in water, they drop to values of less than 0.5 kg after storage in water at a temperature of 70°C for only 6 hours.

EXAMPLE 2

Granules of a polymer containing, as polymerized units, 88 percent of ethylene, 4 percent of acrylic acid and 8 percent of t-butyl acrylate are mixed with 0.5 percent of alizarin and 0.1% of 4,4'-thio-bis-3-methyl-6-t-butyl-1-phenol, based on the copolymer, to form a homogeneous mixture which is then compression molded at a temperature of 180°C to form a 0.3 mm thick sheet. A clean, degreased 0.5 mm thick sheet of iron having the dimensions 16 × 16 cm is coated on one side over a length of 4 cm with aluminum paint to act as parting layer. On the thus prepared iron sheet there is placed an equally large sheet of the carboxyl-containing copolymer having a thickness of 0.3 mm as manufactured above, followed by a 1.2 mm thick panel of polyethylene having a density of 0.918 g/cm$^3$ and a melt index of 1.5 g/10 minutes. The three layers are then placed in a press and bonded together at a temperature of 180°C under an applied pressure of 2 kg/cm$^2$ for 3 minutes. The polymer may be readily parted from the metal sheet at the points where aluminum paint has been applied.. The bonded assembly is cut up into 2.5 cm wide test strips and the bonding strength of the metal/polymer bond is more than 10 kg as measured by the method described in Example 1. The bonding strength of the metal/polymer bond remains at more than 10 kg when the test strips are stored in water at 70°C for 6 hours and for 100 hours.

EXAMPLES 3 TO 17

In the manner described in Example 1, 0.5 mm thick sheets of iron or copper are bonded to a sheet of the carboxyl-containing ethylene copolymer described in Example 1. The ethylene copolymer contains in all cases 0.1 percent of 4,4'-thio-bis-3-methyl-6-t-butyl-1-phenol as thermal stabilizer and also an anthraquinone derivative in the amount stated in the following Table. The panels are cut up into strips having a width of 2.5 cm and these are then stored in water at a temperature of 70°C. The bond strength of the metal/polymer bond is measured after 6 and 100 hours respectively. Before storage in water, the bond strength is more than 10 kg in all cases. The Table provides a survey of the composition of the bonding agent and shows the results obtained therewith.

TABLE

| Ex. | Anthraquinone derivative | Conc. in polymer (% w/w) | Metal | Bond strength metal/polymer in 2.5 cm strips (kg/cm) after storage in water for | |
|---|---|---|---|---|---|
| | | | | 6 hours | 100 hours |
| 3 | 1,2-dihydroxy-3-nitroanthraquinone | 0.5 | Fe | >10 | >10 |
| 4 | 1,4-dihydroxyanthraquinone | 0.5 | Fe | >10 | >10 |
| 5 | 1,8-dihydroxyanthraquinone | 0.5 | Fe | >10 | >10 |
| 6 | 1,2,4-trihydroxyanthraquinone | 0.5 | Fe | >10 | >10 |
| 7 | 1,2,4-trihydroxyanthraquinone | 0.5 | Fe | >10 | >10 |

| Ex. | Anthraquinone derivative | Conc. in polymer (% w/w) | Metal | Bond strength metal/polymer in 2.5 cm strips (kg/cm) after storage in water for 6 hours | 100 hours |
|---|---|---|---|---|---|
| 8 | 1-amino-2-hydroxyanthraquinone | 0.5 | Fe | 8 | 3 |
| 9 | 1-hydroxyanthraquinone | 0.5 | Fe | 6 | 2 |
| 10 | 1,2-dihydroxy-3-sulfoanthraquinone | 0.5 | Fe | >10 | >10 |
| 11 | 1,2-dihydroxy-3-sulfoanthraquinone | 1.0 | Cu | >10 | >10 |
| 12 | 1,5-dihydroxy-4,8-dinitroanthraquinone | 0.5 | Fe | 7 | 3 |
| 13 | 2-hydroxyanthraquinone | 0.5 | Fe | 8 | 2 |
| 14 | 1,5-dichloro-4,8-dihydroxyanthraquinone | 0.5 | Fe | >10 | >10 |
| 15 | 1,8-dihydroxyanthraquinone | 0.5 | Fe | >10 | >10 |
| 16 | 1-amino-2-phenoxy-4-hydroxyanthraquinone | 0.5 | Fe | >10 | >10 |
| 17 | 1-(carboxyphenylamino)-2-carboxyanthraquinone | 0.5 | Fe |  | 2 |

We claim:

1. A method of coating a material selected from the group consisting of copper, brass, zinc, iron and steel or of bonding said metals to each other or to plastics materials using an adhesive, said materials being bonded or coated with said adhesive at a temperature which is above the melting point of the adhesive used and which adhesive essentially consists of a mixture of an ethylene copolymer containing from 0.5 to 30 percent by weight of copolymerized units of an ethylenically unsaturated carboxylic acid with from 0.01 to 5 percent by weight of said ethylene copolymer of a compound having the formula:

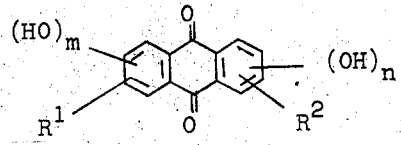

wherein
  $n$ is equal to 1, 2 or 3 and
  $m$ is equal to 0, 1 or 2 and
  $R^1$ and $R^2$ denotes H, Cl, Br, $NO_2$, $SO_3H$, COOH, phenoxy, alkyl, $NH_2$ or $NHR^3$ and
  $R^3$ denotes alkyl or aryl.

2. A method as claimed in claim 1, wherein said ethylene copolymer contains, as polymerized units, from 0.5 to 20 percent w/w of acrylic acid and from 0.5 to 20 percent of t-butyl acrylate.

* * * * *

UNITED STATES PATENT OFFICE
CERTIFICATE OF CORRECTION

PATENT NO. : 3,847,656
DATED : November 12, 1974
INVENTOR(S) : Hans Baumann, Rudolf Glaser and Peter Bauer It is certified that error appears in the above-identified patent and that said Letters Patent are hereby corrected as shown below:

Column 1, line 25, "or" should read --of--.

Column 2, line 65, "form" should read --from--.

Column 10, line 11, after "percent" insert --w/w--.

Signed and sealed this 6th day of May 1975.

(SEAL)
Attest:

RUTH C. MASON
Attesting Officer

C. MARSHALL DANN
Commissioner of Patents
and Trademarks